May 23, 1933.  A. F. RENIK  1,911,164
HEADLIGHT INDICATOR
Filed April 25, 1931  2 Sheets-Sheet 1
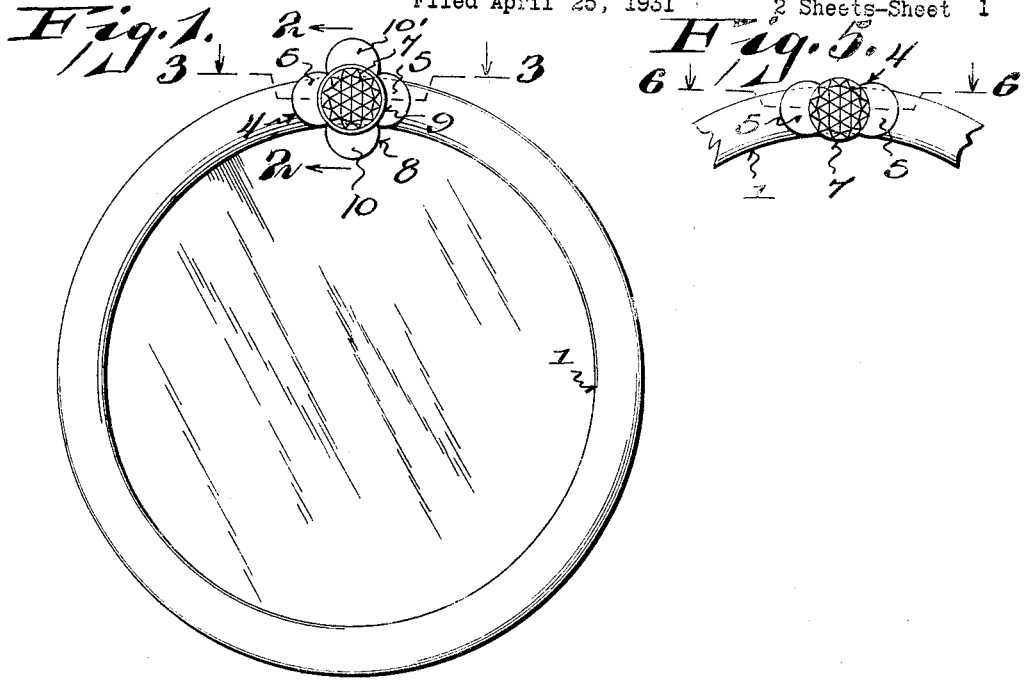
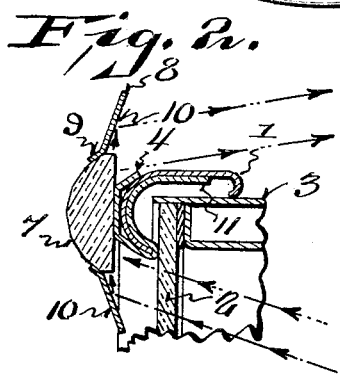
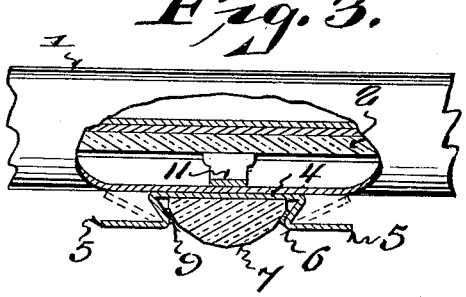
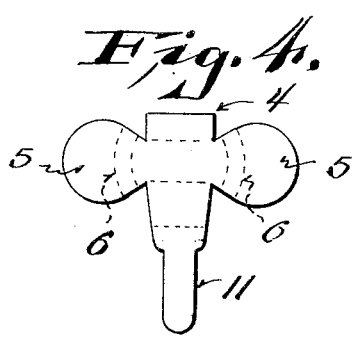
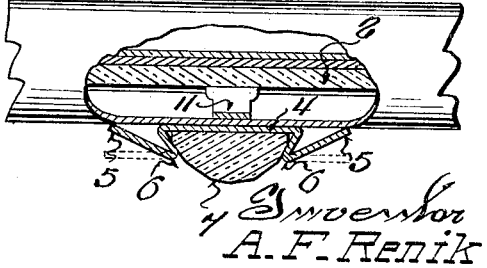
Inventor
A. F. Renik May 23, 1933.  A. F. RENIK  1,911,164
HEADLIGHT INDICATOR
Filed April 25, 1931  2 Sheets-Sheet 2
Fig. 7.
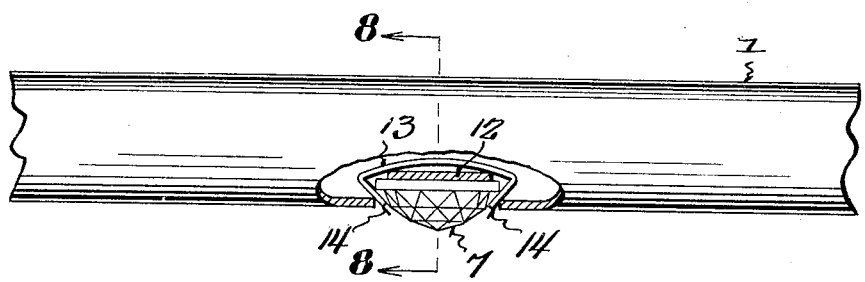
Fig. 8.
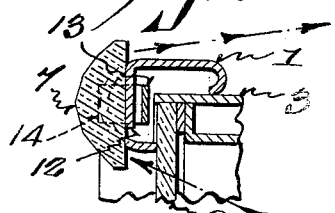
Fig. 9.
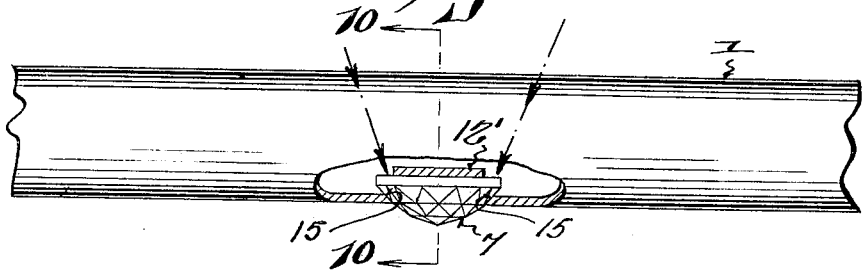
Fig. 10.
Fig. 11
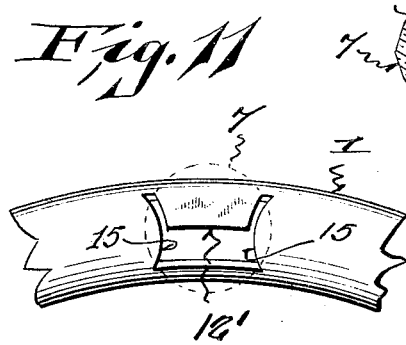
Inventor
A. F. Renik Patented May 23, 1933

1,911,164

UNITED STATES PATENT OFFICE

ANDREW FRANK RENIK, OF KENOSHA, WISCONSIN

HEADLIGHT INDICATOR

Application filed April 25, 1931. Serial No. 532,857.

This invention pertains to headlight indicators, and more particularly to means visible from the rear of a vehicle lamp whereby the driver can readily determine whether or not the lamp is lit.

With the majority of vehicle lamps in present use, it is difficult, if not impossible, for the driver to ascertain whether both headlights are lit, and inasmuch as the laws of most States require that a vehicle carry two headlights, drivers are frequently unconscious offenders, and at the same time subject themselves to danger resulting from confusion to approaching vehicles when one of their lights become extinguished.

Lamp manufacturers have in some instances attempted to overcome the foregoing difficulties by providing a transparent indicator in the rear of the lamp casing. However, such structures are expensive, and inasmuch as the same must project through the reflector, the latter often becomes tarnished and damaged due to leakage.

The present invention has primarily for its object to overcome the foregoing objections by the provision of a comparatively simple, inexpensive, and attractive indicator for the retaining rim of a conventional vehicle lamp, whereby the light rays are reflected rearwardly to enable the driver to determine when the light is lit.

A further object resides in the provision of a prism or glass reflector for the rim of a lamp, which is so positioned on the rim as to reflect rays of light rearwardly of the casing.

A still further object is to provide an indicator of the foregoing character, which may be detachably mounted either on or in the rim.

Incidental to the foregoing, a more specific object of the invention resides in various novel means provided for attachment of the reflector or indicator on the rim.

With the above and other objects in view, which will appear as the description proceeds, the invention resides in the novel construction, combination, and arrangement of parts substantially as hereinafter described and more particularly defined by the appended claims, it being understood that such changes in the precise embodiment of the herein disclosed invention may be made as come within the scope of the claims.

In the drawings, Figure 1 is a front elevation of a rim equipped with one form of the present invention;

Figure 2 is a transverse section taken on the line 2—2 of Figure 1;

Figure 3 is a fragmentary plan view, taken on the line 3—3 of Figure 1;

Figure 4 is a view of the blank from which the retaining clamp is formed;

Figure 5 is a fragmentary front elevation of a modification;

Figure 6 is a detail view taken on the line 6—6 of Figure 5;

Figure 7 is a fragmentary plan detail of another modification, parts broken away and in section;

Figure 8 is a transverse section of the same, taken on the line 8—8 of Figure 7;

Figure 9 is a fragmentary plan view of still another form of the invention, parts being broken away and in section;

Figure 10 is a transverse section taken on the line 10—10 of Figure 9; and

Figure 11 is a fragmentary front elevation of the same, the prism reflector being shown in dotted lines only to illustrate the formation of the rim of the headlight.

Referring now more particularly to the accompanying drawings, the numeral 1 designates a conventional type of rim used to retain the lens 2 on the lamp casing 3, and while a particular type of rim and lamp structure has been indicated, it is to be understood that the invention is applicable to various other structures.

With particular reference to that form of the invention illustrated in Figures 1 to 3, inclusive, the device is designed as an attachment for detachable connection on the retaining rim 1. In this form, the invention comprises a clip 4 formed from a single blank of material, as shown in Figure 4, and having lateral arms 5 folded back upon themselves to provide contracted resilient shoulders 6 that serve to engage and detachably hold a prism or transparent reflector 7 of the jewel type. At the same time, the extended portions of the arms 5 serve to facilitate spreading of the shoulders 6, and also add to the attractive appearance of the device when mounted on a rim.

In some instances, as illustrated in Figures 5 and 6, the clamp 4 is used solely. However, in cases where it is desired to provide additional means for reflecting rays of light for the lamp, and also giving a more elaborate appearance to the indicator, a reflector 8 may be employed, which comprises an angular ring portion 9 adapted to engage the periphery of the prism reflector 7, and provided with extended reflecting wings 10 positioned radially with reference to the lamp and projecting beyond the inner and outer periphery of the rim 1. When the reflector 8 is employed, the same is detachably assembled on the clamp 4 by slipping the annular portion over the prism reflector 7 and between the resilient shoulders 6, as best shown in Figure 3. When the reflector 8 is not employed, the prism itself is engaged under the shoulders 6, as best shown in Figure 6. In order to attach the clamp 4, the same is provided with a lip 11 folded back from the body portion of the clamp and adapted to resiliently engage the innner surface of the ring 1, as best shown in Figure 2, the lip 11 cooperating with the body portion of the clamp to snugly engage the rim, and obviously when the rim is assembled upon the lamp, as shown in Figure 2, the clamp is held against detachment.

In the event that it is desired to provide for removal of the prism reflector 7, without detaching the clamp 4 from the rim, the arms or wings 5 are spaced from the rim, as shown in Figure 3, and when sprung back to the dotted position, obviously the prism reflector will be released as the shoulders 6 will be spread apart. In the event that it is desired to assemble the reflector and clamp in such manner as to prevent removal of the prism reflector without removal of the clamp, then the arms 5 will bend rearwardly, as shown in Figure 6, to engage the face of the rim, thus preventing spreading of the shoulder 6 until such time as the clamp is removed from the rim.

From the explanation thus far, it is believed that the operation of the present invention will be quite apparent, in that rays of light projecting from the usual lamp within the casing will come in contact with the lower portion of the prism reflector 7 exposed beyond the inner periphery of the rim 1, and after being diffused through the prism reflector, the same will be deflected rearwardly, where they are visible to the driver.

When the reflector 8 is employed, obviously reflection of the lamp rays will be accentuated, in that the wings 10 serve to collect additional rays of light and deflect the same through the prism 7 to the rear of the lamp.

In the drawings, the indicator is shown assembled upon the rim at the top of the lamp. However, it is to be understood that the same will function equally as well if positioned at the side of the lamp, it being merely essential that the same be conveniently placed for proper rear vision.

In some instances, it may be desired to mount the prism reflector within the rim 1. This may be accomplished in numerous ways, two of which have been illustrated. In Figures 7 and 8, the outer face of the rim is cut out to provide a lip 12 bent inwardly to form a seat for the prism reflector 7, which is positioned within the cut-out portion of the rim. In order to retain the prism reflector on its seat in this form of the invention, a spring clip 13 is employed which straddles the lip 12 and is provided with inturned fingers 14 which engage the periphery of the prism 7. Thus, it will be seen that in this form of the invention, the prism is detachably held within the rim, and obviously if desired the reflectors 8 may also be used, although as previously explained the same are not essential, in that the prism reflector 7 projects sufficiently beyond the inner and outer peripheries of the rim 1 to collect and deflect rays of light rearwardly.

In some instances it may be desired to permanently mount the prism reflector within the rim, and while this may be accomplished in various ways, one simple form is that disclosed in Figures 9, 10 and 11, wherein the face of the rim is cut out, similar to the structure shown in Figure 7, the opening being of less width than the width or diameter of the prism reflector 7, whereby the edges 15 of the cut-out portion engage the prism reflector and securely retain the same on the inturned lip 12′. Obviously, should it be desired to remove or replace the prism 7, in this form of the invention the same is readily accomplished by bending the lip 12′ inwardly sufficiently to permit the prism reflector to be withdrawn, or bending the edges of the cut-out portion engaging the prism outwardly. Here it will be noted, as indicated by the arrows in Figure 10, that the prism reflector 7 need not necessarily project beyond the inner periphery of the rim in order to collect rays of light from the lamp, inasmuch as the lip 12′ is cut off sufficiently to provide for an opening in the rim through which rays of light come in contact with the prism and are reflected rearwardly.

While several forms of the invention have been illustrated and described in some detail, it is to be understood that various structures are contemplated for obtaining the desired results, it being primarily essential to the invention that the prism reflector 7 be so mounted on the rim either permanently or detachably, to collect rays of light from the lamp and deflect the same rearwardly. Obviously, this is accomplished in a very simple and effective manner by so constructing the prism reflector so that the same projects beyond the inner and outer periphery of the rim, thus serving to deflect rays of light from the lamp, which will then deflect through the prism and are visible at the rear of the lamp.

It is to be further understood that while the drawings illustrate the prism reflector 7 being positioned vertically on or within the rim, the same may be readily positioned at any angle, and either in the front of the rim or on the periphery. This is particularly true where the rim is provided with an opening of any nature to permit rays of light from the lamp to project therethrough and come in contact with the prism reflector.

I claim:

1. The combination with a vehicle headlight including a rim and a transparent panel engaged by said rim, of means for indicating the condition of the headlight including a jewel reflector, means for securing the jewel reflector to the rim comprising a holder including a back plate of less width than the diameter of the reflector and resilient lips carried by the back plate detachably engaging the jewel reflector, said reflector projecting beyond the inner and outer peripheries of the rim.

2. The combination with a vehicle headlight including a rim and a transparent panel, of means for indicating the condition of the headlight comprising a jewel reflector, means for detachably connecting the reflector to the rim comprising a back plate and forwardly projecting resilient lips formed on the opposite sides of the plate for releasably engaging the reflector, and a clip formed on the back plate detachably engaging the rim.

3. The combination with a vehicle headlight including a rim and a transparent panel, of means for indicating the condition of the headlight, comprising a jewel reflector, means for detachably connecting the deflector to the rim comprising a clamp of less width than the diameter of the jewel reflector, and resilient lips formed on opposite ends of the clamp for releasably engaging said reflector, said clamp having interengagement with said rim, and said jewel reflector projecting beyond the inner and outer peripheries of the rim.

In testimony that I claim the foregoing I have hereunto set my hand at Kenosha, in the county of Kenosha and State of Wisconsin.

ANDREW FRANK RENIK.